3,407,170
LIGHT STABILIZED POLYAMIDE AND PROCESS THEREFOR

Lawrence J. Exner, Scranton, Pa., assignor to Rohm & Haas Company, Philadelphia, Pa., a corporation of Delaware
No Drawing. Filed July 16, 1965, Ser. No. 472,729
5 Claims. (Cl. 260—41)

ABSTRACT OF THE DISCLOSURE

Polyamide fibers produced from a polymerization reaction mixture containing a delustering agent are stabilized against degradation caused by exposure to light by incorporating in the reaction mixture a stable form of manganous ion. The light stabilizer is in the form of a polymeric salt of manganese and is characterized by the bonding of an anionic organic polymer to the manganous cation. The organic anion may be selected from polyacrylic acid, polymethacrylic acid, or water-soluble salts thereof.

---

This invention relates to polyamides which have been modified to prevent discoloration and deterioration by the action of light. In particular, this invention relates to the incorporation of a stabilizing agent in a polyamide to provide color-free, light durable products suitable for use in yarns, fibers and monofilaments.

Polyamides are the oldest completely synthetic fiber commercially produced. Their initial synthesis by Carrothers is one of the triumphs of modern chemistry and their subsequent swift commercialization has been a story of both financial and scientific success. Polyamide fibers, known generally as "nylon," comprise a large chemical family. Commercially the most important members of the family are polycaprolactam, known as nylon 6, and polyhexamethylene adipamide, known as nylon 66. Of less importance are nylon 4, nylon 7, nylon 6–10 and nylon 12.

As the term "polyamide" indicates, all of these fibers have in common polymeric chains linked by amido groups. Nylon is known for its high strength and generally excellent textile properties. However, nylon suffers from a major deficiency in that it is readily attacked by light. Light not only discolors the nylon fibers, but causes deterioration of the yarns as evidenced by a drastic and relatively rapid fall-off in tensile strength and elongation. These undesirable physical changes are aggravated by the presence of standard delustering agents, such as titanium dioxide.

A host of chemicals have been found to act as light stabilizers for nylon. Among the most desirable of the light stabilizers are those containing manganous ion. The ability of manganese to act in this manner was disclosed at least as long ago as 1942 in British application No. 3,725/42. It has been found that the nature of the anion to which the manganese is linked has a profound effect upon the ability of the manganese to function efficiently as a light stabilizer in nylon. See, for example, U.S. Nos. 2,887,462, 2,984,647, 2,985,621, and 3,110,697. Generally, inorganic anions and in particular anions containing phosphorous (as phosphate etc.) have been found particularly advantageous for combination with manganese in providing efficient light stabilizers for use in polyamide fibers. Although a few simple organic anions have been disclosed as successful (as in 3,110,697), as pointed out in the other patents cited, organic anions often have specific defects which limit their utility.

It is an object of the present invention to incorporate manganous ion into nylon fibers with the use of organic anions and with deleterions coloration of the fibers.

It is a further object of the invention to provide a stable form of manganous ion for incorporation into polyamide fibers which is not extracted from the fibers by water.

Again, it is an object of the invention to incorporate manganous ion into polyamide fibers without the use of excess amounts of dispersing agents for dispersing the delustering agent.

Another object of the invention is to provide a novel polymeric salt of manganese as a light stabilizer in polyamides.

These and other objects of the invention become apparent in the following description of the invention.

In accordance with the invention, it has been found that the manganous salt of poly(meth)acrylic acid acts as an efficient light stabilizer for polyamide fibers. By the term "poly(meth)acrylic acid" is meant both polyacrylic acid and polymethacrylic acid.

The filaments produced from a polyamide containing a manganous salt of poly(meth)acrylic acid according to the instant invention have an excellent degree of whiteness and, even after long exposure, show no significant signs of yellowing. Further, the fibers show no serious impairment of tensile strength after extended exposure. These improvements are obtained at extremely small additions of manganous ion.

One of the outstanding characteristics of the invention is the high efficiency and exceedingly small amounts of manganous ion needed to effect stabilization. As little as about 5 p.p.m. of manganous ion has a significant effect to stabilize the polyamide against the action of light and up to 400 p.p.m. or more of manganous ion may be used without deleterious effect. It is preferred to use about 10 to 20 parts per million of manganous ion to achieve a desirable level of effective stabilization against the action of light. Larger amounts of manganous ion may be used if desired as the maximum quantity is not critical. However, larger amounts are successively less effective at producing concomitant increases in light stabilization. Thus, a preferred range of from about 10 to about 20 p.p.m. represents an economical range to achieve effective stabilization at a minimum of cost.

For dispersing action and for reaction with manganous ion, either the free poly(meth)acrylic acid or a water-soluble salt thereof may be used. The amount of poly(meth)acrylic acid is not critical. When poly(meth)acrylic acid is used for dispersing the delustering agent, sufficient poly(meth)acrylic acid should be used to obtain the desired degree of dispersing action for the titania or delustering agent used. In addition, sufficient poly(meth)acrylic acid should be provided to react with the manganous ion present. This reaction is generally carried out separately, as illustrated, or it can be carried out by addition of the manganous salt directly to the titania slurry.

Any water-soluble manganese salt may be used to form the manganous poly(meth)acrylate. Suitable salts include, for example, manganous sulfate, manganous acetate, manganous chloride, etc.

If desired, other additives as heat stabilizers, antioxidants, etc., may be incorporated in the polyamide-manganous poly(meth)acrylate compositions of the invention. Thus, copper salts, halogen ions, etc. (as disclosed for example in U.S. 2,960,489 and 3,113,120) may be added to the polyamide in known manner to obtain the indicated improvement.

In the following examples, which are intended to illustrate but not limit the invention, the parts and percentages are by weight, unless otherwise indicated.

EXAMPLE 1

Thirteen hundred and twenty pounds of caprolactam were melted under a nitrogen blanket. To the molten caprolactam there was added at 77° C. a solution consisting of 48 grams manganous acetate tetrahydrate, 500 ml. of deionized water, 585 grams of glacial acetic acid, and 141.5 grams of a 30% solids solution of poly(sodium methacrylate) in deionized water. This mixture was passed to the reactor over a period of 17 hours where it was mixed with 63 pounds of a titanium dioxide (anatase) slurry containing 5.65% solids.

The slurry was prepared by mixing 22 pounds of titanium dioxide and 80 grams of a 30% aqueous solution of polymethacrylic acid with sufficient water to form about a 40% solids slurry. This slurry was allowed to settle. After 48 hours, the upper slurry containing about 44 pounds and having a solids content of 37.7% was separated from the lower portion. This upper slurry was then diluted with water to a specific gravity of about 1.06 and allowed to settle for an additional 48 hours. The upper portion of this slurry weighed 199.3 pounds with 5.65% solids and was the slurry added to the polymerization reactor.

The mixture was polymerized in the reactor for 24 hours at a temperature of about 220° to 252° C. The resulting polymer contained 0.27% titania and 16 parts per million of manganese in the form of manganous polymethacrylate. The polymer was spun into 15 denier monofilaments and cold drawn at a draw ratio of 1:3.99. After 48 hours exposure to UV (20 watt fluorescent tube, FS20), the fibers retained 95.2% of their initial tensile strength, and after 250 hours exposure retained 79.5%. The control sample run in the same manner but without the presence of the manganous ion and using tetrasodium pyrophosphate to disperse the titania rather than the sodium salt of polymethacrylic acid retained only 50% of its tensile strength after only 75 hours exposure.

A portion of the yarn containing manganous polymethacrylate was knitted on a single feed circular knitting machine, scoured and immersed for 20 minutes in baths containing a commercial chlorine bleach and a commercial oxygen bleach, both baths being maintained at 50–55° C. In each case, the bleach was used at twice the recommended concentration. No deleterious effect was observed.

EXAMPLE 2

A nylon yarn was prepared as in Example 1 containing 16 p.p.m. manganese as the poly(manganous methacrylate). The yarn so produced together with five commercial nylon yarns were exposed to ultraviolet light (xenon light in an Atlas Weather-O-Meter) to determine the time necessary for the yarn to lose half its tensile strength. All of the commercial yarns contained both manganese and copper. Copper is understood to function as a photostabilizer and has been claimed to improve the oxidation stability of polyamides. The commercial yarns were analyzed for both manganese and copper. The results are set forth in the following table:

| Yarn | Mn (p.p.m.) | Cu (p.p.m.) | Time to lose ½ tensile (hrs.) |
|---|---|---|---|
| Example 2 | 16 | (¹) | 350 |
| Nylon 66-A | 40 | 50–100 | 500 |
| Nylon 66-B | 100 | 50–100 | 700 |
| Nylon 66-C | 50 | 50–100 | 300 |
| Nylon 6-D | 40 | 50–100 | 450 |
| Nylon 6-E | 150 | 50–100 | >1,000 |

¹ None.

What is claimed is:

1. A composition comprising substantially color-free fiber-forming synthetic linear polyamide containing a delustering amount of titanium dioxide and between about 5 and about 400 parts per million of manganous ion present in the composition as a manganous salt selected from the group consisting of manganous polyacrylate and manganous polymethacrylate.

2. A composition according to claim 1 wherein the polyamide is a polycaprolactam.

3. A composition according to claim 1 wherein the polyamide is a polyhexamethylene adipamide.

4. A process of treating a fiber-forming synthetic linear polyamide to enhance the light durability thereof comprising incorporating into a fiber-forming synthetic linear polyamide containing a delustering amount of titanium dioxide between about 5 and about 400 parts per million of manganous ion in the form of a manganous salt selected from the group consisting of manganous polyacrylate and manganous polymethacrylate by admixing said manganous salt with the monomers reacted to form the polyamide prior to polymerization of said monomers.

5. The process of treating fiber-forming synthetic linear polyamides to enhance the light durability thereof comprising forming an aqueous dispersion of titanium dioxide containing an acid selected from the group consisting of polyacrylic acid and polymethacrylic acid as the dispersing agent, adding a water-soluble manganous salt to said dispersion, and incorporating the dispersion into the polymer by admixing with the monomers reacted to form the polymer prior to polymerization of said monomers, the amount of titanium dioxide added in said slurry being sufficient to deluster the polyamide and the amount of manganous ion present in the titanium dioxide slurry being sufficient to provide a concentration of manganous ion in the polyamide of from about 5 to 400 parts per million of manganese.

References Cited

UNITED STATES PATENTS

| 3,002,947 | 10/1961 | Maple | 260—37 |
| 3,242,134 | 3/1966 | Papero | 260—45.75 |
| 3,324,071 | 6/1967 | Skoog et al. | 260—37 |

FOREIGN PATENTS

| 528,791 | 8/1956 | Canada. |

ALLEN LIEBERMAN, *Primary Examiner.*